June 12, 1951 — D. McDONALD — 2,556,593
TIRE COMPRESS AND CONTROL
Filed May 5, 1948 — 2 Sheets-Sheet 1
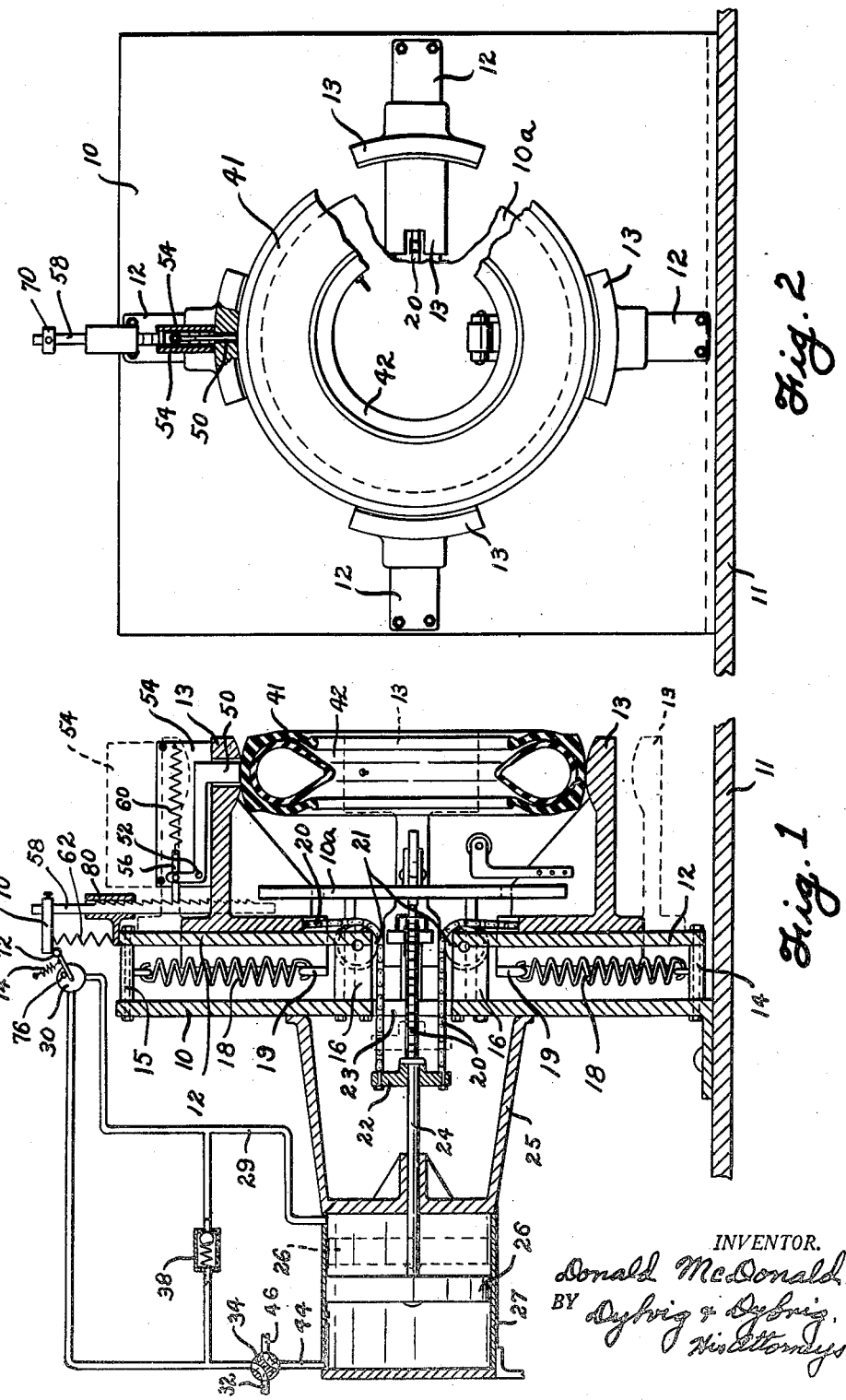
INVENTOR.
Donald McDonald
BY Dybvig & Dybvig
His Attorneys.

June 12, 1951 D. McDONALD 2,556,593
TIRE COMPRESS AND CONTROL
Filed May 5, 1948 2 Sheets-Sheet 2

Donald McDonald, INVENTOR.
BY Dybvig & Dybvig
His Attorneys.

Patented June 12, 1951

2,556,593

UNITED STATES PATENT OFFICE 2,556,593

TIRE COMPRESS AND CONTROL

Donald McDonald, Dayton, Ohio

Application May 5, 1948, Serial No. 25,182

10 Claims. (Cl. 18—2)

This invention relates to a tire compress and control and more particularly to a method and apparatus for use in compressing tire casings preparatory to and during the process of removing pressure bags therefrom after the vulcanization of the casings.

In the art of manufacturing tires, the tire is first built of raw rubberized cords and raw rubber which must be formed into tire shape. In forming the tires, a pressure bag is inserted into the crudely formed tire and the tire with the enclosed bag is then inserted in a mold in which the tire is subjected to vulcanizing heat and simultaneously a pressure medium is introduced into the bag, expanding the same in such a manner as to stretch the cords in the tire and force the tire against the walls of the molding whereby the rubberized cords will be cured under tension and the surface of the tread and sides of the tire will be molded to the desired shape.

The present invention has for its purpose the provision of a procedure and means for carrying out that procedure, whereby the removal of the pressure bags from the tires after the vulcanization may be quickly and effectively accomplished without danger of injury to the tires.

One object of this invention is to provide a compress which may be used for tires of various sizes without danger of injury to the tires.

Another object of this invention is to provide an automatic control for a tire compress which eliminates the need for manually regulating the extent of movement of the compress jaws.

Another object of this invention is to provide a control arrangement which may be attached to existing compresses without the need for any major alteration in the compress construction.

Still another object of this invention is to provide a control for a compress which is inexpensive to manufacture and dependable in use.

Still another object of this invention is to provide a compress control which may be used for controlling either a pneumatically operated compress or an electrically operated compress.

Other objects and advantages reside in the construction of parts, the combination thereof and the mode of operation, as will become more apparent from the following description.

In the drawings, Figure 1 is a vertical sectional view showing somewhat diagrammatically a preferred embodiment of my invention;

Figure 2 is an elevational view with parts broken away; and

Figure 3:
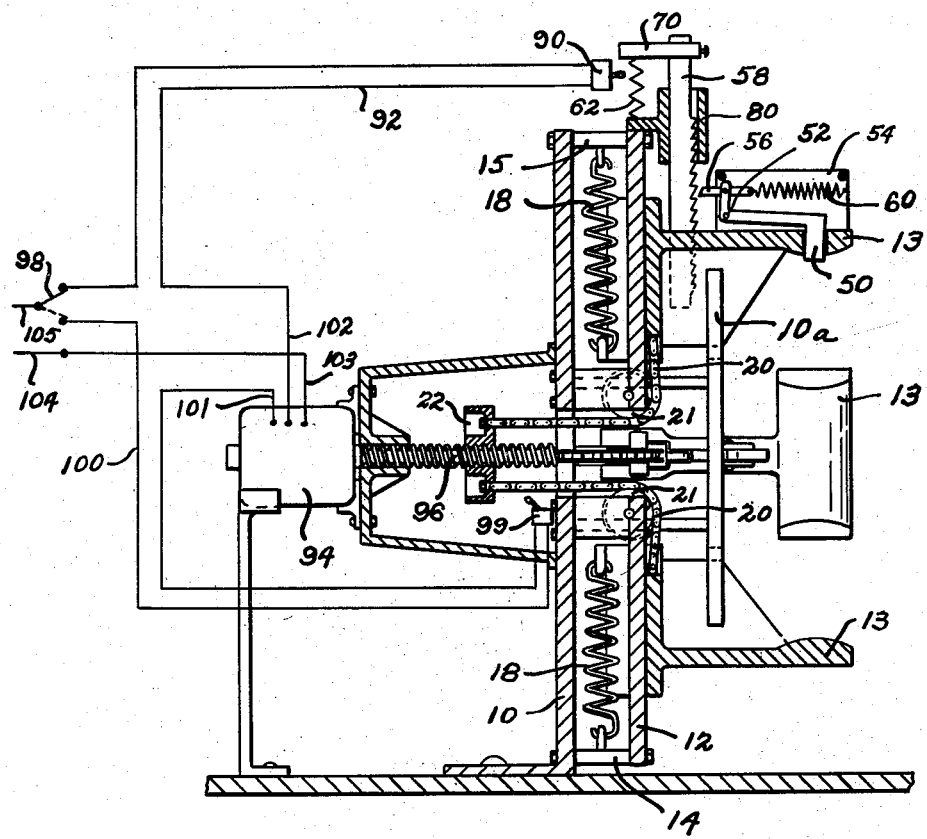
Figure 3 is a vertical sectional view showing an electrically operated compress provided with my improved control.

Referring now to the drawings wherein preferred embodiments of my invention have been shown, reference numeral 10 represents a main supporting plate or frame which is preferably held in a vertical position or at a slight angle to the vertical position on a support or floor 11. A plurality of radially movable tire engaging jaws 13 are slidably supported on a corresponding number of radially arranged guides 12 which are spaced from the plate 10 by means of spacers 14 and 16. The number of jaws used may be varied somewhat without departing from the spirit of my invention, and in order to simplify the disclosure, I have shown only four jaws, whereas in actual practice one would use six or more jaws, depending partly upon the size of the tires to be held thereby. The spacers 16 constitute bearing blocks arranged at the inner ends of the guides 12. Each of the pressure elements or jaws 13 is normally urged radially outwardly by a spring 18 connected at one end to one of the elements 14 and at the other end to a projection 19 on the jaws 13.

For simultaneously urging the jaws 13 against the action of springs 18, each jaw has its own operating chain 20 connected thereto, trained over a sprocket 21 journalled in the bearing block 16 and connected to a reciprocating cross-head 22. The chains pass through an aperture 23 formed in the center of the plate 10 at a point to the rear of the stationary guard plate 10a. Reciprocation of the cross-head 22 may be effected by any suitable means such as pneumatic power, electric power, or the like.

In Figures 1 and 2 of the drawings, I have shown a pneumatic arrangement comprising a connecting rod 24 slidably mounted in a bracket 25 secured to the rear of the plate 10 and operable by a piston 26 in a cylinder 27 secured to bracket 25 as shown. The operation of the compress jaws 13 is controlled by the four-way valve 34 which may be either manually or automatically controlled, so as to supply compressed air or some other operating fluid to either end of the cylinder 27, so as to cause the desired reciprocation of the piston 26. The operating fluid is supplied through the line 32 to the control valve 34 which selectively directs the fluid either into the line 36 which leads to the valve 30 and the right side of the piston 26 or into the line 44 which leads directly to the left side of the piston 26. A check valve 38 is arranged in a by-pass line 40 and permits the flow of fluid in the one direction only, as will be explained more fully hereinafter. When the valve 34 is arranged in the full line position, the fluid under pressure serves to move the piston 26 to the left, as viewed in the drawing, so as to cause the tire engaging jaws to move into engagement with the outer periphery of the tire casing, so as to exert sufficient pressure on the tire casing to facilitate the removal of the pressure bag 42 from the tire casing 41 at which time the valve 30 will be automatically closed in a manner to be explained hereinafter. It will be noted that the check valve 38 prevents the flow of air to the cylinder 27 when the valve 30 is closed.

As the piston 26 moves to the left during the initial compress closing operation, the fluid disposed in the left end of the cylinder 27 is free to escape through the line 44 and the fluid outlet 46. When using compressed air, the outlet 46 merely relieves the air to the atmosphere, whereas when using liquid for operating the piston 26, the outlet 46 would lead to the main liquid supply reservoir not shown.

Excessive pressure on the tire casings, especially when the tire casings are still hot, may cause serious injury to the tire casings and the tire bead. In order to automatically regulate the extent of movement of the jaws 13 when moving into engagement with a tire casing, I have provided a novel arrangement which eliminates the need for manually setting the apparatus for different tire sizes and which eliminates the danger of the jaws from exerting too great a pressure on the tire casings.

As best shown in Figure 1 of the drawings, the apparatus for controlling the extent of movement of the jaws comprises a feeler in the form of a bell crank lever 50 which is pivotally supported on a pin 52 carried between a pair of supporting plates 54 which are attached to the top jaw 13 so as to move with the jaw. The one end of the bell crank lever 50 is adapted to normally extend downwardly below the bottom surface of the upper jaw 13, so as to engage the tire when the jaw 13 moves downwardly to engage the top of the tire.

The upper end of the bell crank lever 50 pivotally supports a pawl 56 which is adapted to cooperate with the teeth on a reciprocating rack 58 slidably supported in a stationary guide 80 fixed to the upper end of the guide 12, as indicated in the drawing. Figure 1 shows the pawl 56 in engagement with the rack 58 as a result of the jaw 13 and the lower end of the bell crank lever 50 having moved into contact with the tire casing, whereas Figure 3 shows the pawl 56 out of engagement with the rack 58. After the pawl 56 moves into engagement with the teeth on the rack 58, further downward movement of the jaw 13 moves the rack 58 downwardly, so as to actuate the valve 30 to the closed position, thereby stopping further closing movement of the compress jaw 13. The spring 62 biases the rack 58 upwardly.

A spring 60, having one end secured to the supporting plates 54, exerts a pull on the pawl 56 and thereby tends to hold the pawl out of engagement with the teeth on the rack and also tends to rotate the bell crank 50 about the pivot 52, so as to move the lower end of the bell crank downwardly beyond the bottom surface of the jaw 13. However, after the jaws 13 have moved radially inwardly far enough so that a predetermined amount of pressure has been applied to the outer periphery of the tire, the lower end of the bell crank or feeler 50 will have moved upwardly and will have moved the pawl 56 into engagement with the teeth on the rack 58. Since the supporting plates 54 on which the bell crank 50 and pawl 56 are supported move with the jaw 13, the rack 58 will move with the jaw 13 after the pawl 56 moves into engagement with the teeth on the rack 58.

The spring 60 is strong enough to cause reciprocation of the rack 58 under normal conditions but is not strong enough to hold the pawl 56 in driving engagement with the teeth on the rack in the event that the rack or valve mechanism operated thereby offers excessive resistance to movement. For purposes of illustrating my invention, I have shown the lower end of the bell crank 50 passing through an aperture in the jaw 13, whereas the bell crank 50 could be arranged to extend along one side of the jaw 13.

The rack 58 is provided with an arm 70 which may be vertically adjusted on the upper end of the rack 58 and which is adapted to engage the operator 72 of the valve 30. A spring 74 normally biases the valve operator 72 into the valve opening position, so that as the arm 70 moves upwardly, the valve 30 automatically returns to the open position, the valve operator coming to rest against the stop 76.

By adjusting the arm 70 in a vertical direction relative to the rack 58, it is possible to adjust the amount of travel of the jaws after the jaws engage the tire. Normally the arm is adjusted so that the jaws will move approximately four to six inches beyond the initial point of contact between the jaw and the tire. Any further movement of the jaws is unnecessary for holding the tire and, in fact, may result in serious damage to the tire. The distance traveled by the jaws 13 after engagement with the tire may be varied without departing from the spirit of my invention.

When it is desired to release the tire casing from the compress, the valve 34 is moved into the dotted line position, so as to connect the outlet side of the check valve 38 to the exhaust fluid outlet 46 and introduce fluid from 32 into the left end of the cylinder 27 through the line 44.

In Figure 3 of the drawings, I have shown an arrangement in which an electric motor 94 is used for reciprocating the cross-head 22 of a device corresponding in other respects to the device described hereinabove. Like reference numerals have been used to designate like parts in all figures of the drawings, and unless otherwise indicated, the parts are similar in construction and operation. In the modification shown in Figure 3, a switch 90 has replaced the valve 30 and is adapted to be operated in the same manner and by the same kind of mechanism used to operate the valve 30. The electric motor 94 is provided with a threaded drive shaft 96 for operating the cross-head 92. The operation of the motor 94 is controlled by a reversing switch 98 which is arranged in the circuit as shown. It is obvious that the electric circuit may be varied depending upon the particular type of motor and motor controls used. For purposes of illustrating the invention, I have shown a conventional motor having three leads 101, 102 and 103. The lead 103 has been shown directly connected to the power line 104 at all times, whereas the lead 102 is connected to the power line 105 only when the switch 98 is in its full line position and the switch 90 is also closed. When current is supplied to the motor through the leads 102 and 103, the motor will operate in the one direction, whereas when current is supplied to the motor through the leads 101 and 103, such as when the switch 98 is in its dotted line position and the limit switch 99 is closed, the motor will be operated in the opposite direction. When the control switch 98 is moved to its upper position, it energizes the motor 94 through the line 92 and switch 90 in a direction to cause the jaws 13 to move inwardly. When the jaws 13 have moved inwardly the correct amount, the switch 90 will be actuated to the open circuit position so as to stop the motor. In order to reverse the movement of the jaws 13 so as to release the tire, the switch 98 is moved into its dotted line position so as to energize the motor in the reverse direction through the line 100. A limit switch 99 has been provided in the line 100 for opening the circuit to the motor when the jaws have moved to their outer limits, at which time the cross-head 22 moves into engagement with the switch 99 so as to open the circuit to the motor and stop the same.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. An attachment for a compress having a movable jaw comprising in combination, a support adapted to be attached to the movable jaw of said compress, a lever pivotally mounted on said support, said lever having a portion arranged to be engaged by the article to be compressed, a pawl supported on said lever and adapted to be actuated by movement of said lever, a complementary ratchet member, means for slidably supporting the ratchet member adjacent said pawl so as to be operated thereby, and means operated by said ratchet member for controlling the operation of said jaw.

2. In combination with a tire compress having a stationary support and a movable jaw slidably mounted on said support, a frame member attached to said jaw, a bell crank lever, means for pivotally supporting said bell crank lever on said frame member with the one end of the bell crank lever arranged to engage the tire upon movement of the jaw toward the tire engaging position, a pawl, means for supporting said pawl on the other end of said bell crank lever, a complementary ratchet, means for movably supporting said ratchet, means for biasing said pawl out of engagement with said ratchet and for biasing said bell crank lever into engagement with the tire, and means operated by said ratchet for controlling the operation of said jaw.

3. In combination with a tire compress having a stationary support and a movable jaw slidably mounted on said support, a frame member attached to said jaw, a bell crank lever, means for pivotally supporting said bell crank lever on said frame member with the one end of the ball crank lever arranged to engage the tire upon movement of the jaw toward the tire engaging position, a pawl, means for pivotally supporting said pawl adjacent the other end of said bell crank lever, a ratchet, means for slidably supporting said ratchet, means for biasing said pawl out of engagement with said ratchet and for biasing said bell crank lever into engagement with the tire, and means operated by said ratchet for controlling the operation of said jaw, said last named means comprising an arm adjustably supported on said ratchet.

4. In a device for use in compressing tire casings during the process of removing annular pressure bags from the tire casings, a frame, a plurality of jaw elements, means for supporting said jaw elements on said frame so as to surround and embrace a tire casing, means for relatively moving the jaw elements against the outer periphery of the casing to spread the casing beads apart about their entire extent, and means responsive to the size of said tire casing for automatically limiting the movement of the jaw elements after coming in contact with the outer periphery of the tire casing.

5. In an attachment for a tire compress for regulating the degree of closing of the movable compress jaws so as to compensate for differences in tire sizes, a lever, means for pivotally supporting said lever on one of said movable jaws, and means operated in response to pivotal movement of said lever resulting from contact with a tire for limiting the closing movement of said movable jaws.

6. In an attachment for a multiple jaw tire compress for regulating the degree of movement of the compress jaws so as to compensate for differences in tire sizes, a feeler, means for supporting said feeler for movement in synchronism with one of said jaws so as to engage the tire to be held by said compress, and means operated by said feeler for stopping the movement of said jaw a predetermined interval after the feeler first contacts the tire.

7. In a tire compress, a support, a pair of jaws mounted for relative movement on said support, means for producing relative movement of said jaws so as to cause said jaws to move into engagement with the tire to be gripped thereby, and means for automatically limiting the degree of movement of said jaws after coming in contact with said tire, said last named means being responsive to the tire size whereby the extent of closing of said jaws is determined by the tire size.

8. An attachment for a tire compress or the like for regulating the degree of closing of the movable compress so as to compensate for differences in tire sizes comprising in combination, a support adapted to be attached to one of the movable jaws of the compress, a lever pivotally mounted on said support, a pawl supported on said lever and adapted to be actuated by movement of said lever, a ratchet member, means for slidably supporting the ratchet member adjacent said pawl so as to be operated thereby, and means operated by movement of said ratchet member for controlling the operation of said jaws.

9. In a tire compress, a frame, a plurality of jaw elements, means for slidably supporting said jaw elements on said frame, a fluid operated piston for actuating said jaw elements, a control for said piston, means for regulating the degree of closing of said movable jaw elements so as to compensate for differences in tire sizes including position responsive mechanism carried adjacent the face of one of said jaw elements, and means operated in response to a predetermined relative position of a tire and said mechanism for operating said control, said last named means being so constructed and arranged as to allow a predetermined movement of said jaw elements after engagement with a tire, said control comprising a valve for regulating the flow of fluid to said piston.

10. In a tire compress, a frame, a plurality of jaw elements, means for slidably supporting said jaw elements on said frame, means including an electric motor for operating said jaw elements into and out of engagement with the outer periphery of tires to be compressed, a control for said motor comprising a switch arranged in the motor circuit, means for regulating the degree of closing of said jaw elements so as to compensate for differences in tire sizes including position responsive mechanism carried by one of said jaw elements, and means operated in response to a predetermined relative position of a tire disposed between said jaw elements and said mechanism for operating said switch, said last named means being so constructed and arranged as to allow a predetermined movement of said jaw elements in the tire compressing direction after said position responsive mechanism engages the tire being compressed before operating said switch.

DONALD McDONALD.

REFERENCES CITED

The following references are of record in the file of this patent:

UNITED STATES PATENTS

| Number | Name | Date |
| --- | --- | --- |
| 376,541 | Mergenthaler | Jan. 17, 1888 |
| 1,738,504 | Stevens | Dec. 3, 1929 |
| 1,869,895 | Hazenfield | Aug. 2, 1932 |
| 2,166,319 | Pocock et al. | July 18, 1939 |
| 2,375,946 | Reichelt | May 15, 1945 |